United States Patent [19]

Lokai et al.

[11] Patent Number: 5,659,419
[45] Date of Patent: Aug. 19, 1997

[54] TUNABLE NARROWBAND OPTICAL PARAMETRICAL OSCILLATOR

[75] Inventors: Peter Lokai, Bovenden; Uwe Stamm, Göttingen, both of Germany

[73] Assignee: Lambda Physik Gesellschaft Zur Herstellung Von Lasern mbH, Germany

[21] Appl. No.: 499,898

[22] Filed: Jul. 11, 1995

[30] Foreign Application Priority Data

Aug. 23, 1994 [DE] Germany .................. 44 29 898.6

[51] Int. Cl.$^6$ .................................................. G02F 1/39
[52] U.S. Cl. ........................................ 359/330; 372/21
[58] Field of Search .......................... 359/326, 330; 372/21, 22, 20

[56] References Cited

U.S. PATENT DOCUMENTS

| | | | |
|---|---|---|---|
| 4,399,540 | 8/1983 | Bücher | 372/20 |
| 4,575,645 | 3/1986 | Komine | 307/426 |
| 5,047,668 | 9/1991 | Bosenberg | 359/330 |
| 5,053,641 | 10/1991 | Cheng et al. | 359/330 |
| 5,065,046 | 11/1991 | Guyer | 359/330 |
| 5,121,398 | 6/1992 | Rao | 372/20 |
| 5,128,601 | 7/1992 | Orbach et al. | 372/30 |
| 5,136,596 | 8/1992 | Rao et al. | 372/20 |
| 5,157,676 | 10/1992 | Wilcox | 372/21 |
| 5,260,954 | 11/1993 | Dane et al. | 372/25 |
| 5,285,059 | 2/1994 | Nakata et al. | 250/205 |
| 5,315,604 | 5/1994 | Chiu et al. | 372/25 |
| 5,323,260 | 6/1994 | Alfano et al. | 359/244 |
| 5,406,571 | 4/1995 | Bücher et al. | 372/20 |

FOREIGN PATENT DOCUMENTS

| | | | |
|---|---|---|---|
| 41 38 843 | 11/1991 | Germany | G02F 1/39 |
| 42 19 169 | 6/1992 | Germany | H01S 3/10 |

OTHER PUBLICATIONS

E.A. Golovchenko, E.M. Dianov, P.V. Mamyshev, A.M. Prokhorov & D.G. Fursa, "Theoretical and experimental study of synchronously pumped dispersion–compensated femtosecond fiber Raman lasers," *J. Opt. Soc. Am. B*, vol. 7, No. 2, Feb. 1990, pp. 172–181.

A. Fix, et al., "Tunable β–barium borate optical parametric oscillator: operating characteristics with and without injection seeding," *J. Opt. Soc. Am. B*, vol. 10, No. 9, Sep. 1993, pp. 1744–1750.

J.A. Giordmaine, et al., "Turnable Coherent Parametric Oscillation in $LiNbO_3$ at Optical Frequencies," *Phyisical Review Letters*, vol. 14, No. 24, Jun. 14, 1965, pp. 973–976.

*Primary Examiner*—John D. Lee
*Attorney, Agent, or Firm*—Limbach & Limbach L.L.P.

[57] ABSTRACT

A tunable narrowband optical parametrical oscillator (OPO) is excited in pulsed fashion to generate tunable narrowband radiation. A wavelength selective means (T, G) disposed outside the resonant cavity (M3, M4) of the optical parametrical oscillator reduces the bandwidth of the OPO radiation generated. A pumping pulse is divided by a beam splitter (DM1) into at least two partial pulses, and the delay between the two partial pulses is adjusted by means of a delay distance (D) in such a mannner that the first partial pulse will pump the crystal of the optical parametrical oscillator, part of the OPO radiation thus generated passing through the wavelength selective means which is arranged outside the resonant cavity, being coupled back into the resonant cavity, and passing through the crystal (C) once again when the second partial pulse (2) pumps the crystal (C).

9 Claims, 1 Drawing Sheet

TUNABLE NARROWBAND OPTICAL PARAMETRICAL OSCILLATOR

FIELD OF THE INVENTION

The instant invention relates to an optical parametrical oscillator (OPO) adapted for narrowband tuning by pulse-shaped stimulation of a non-linear optical crystal disposed in an optical resonant cavity, comprising means for coupling pumping beams into the crystal, a wavelength selective means, and a means for coupling the radiation out of the resonant cavity.

BACKGROUND OF THE INVENTION

An optical parametrical oscillator of this kind is known from DE 42 19 169 A1.

Quite generally, tunable optical parametrical oscillators (OPOs) have been known for more than 25 years (J. A. Giordmaine, R. C. Miller, Phys. Rev. Lett. 14, 973 (1965). Reference is made also to U.S. Pat. Nos. 5,053,641 and 5,047,668 as regards the state of the art.

As far as tunable narrowband OPOs are concerned, reference is made to the publication by A. Fix, T. Schröder, R. Wallenstein, J. G. Haub, M. J. Johnson, B. J. Orr, JOSA B-10, 1744 (1993).

The above mentioned prior publication DE 42 19 169 A1 describes a laser arrangement for generating tunable narrowband coherent radiation, comprising first and second optical parametrical oscillators. In this case the spectral bandwidth of the original radiation of one of the two optical parametrical oscillators is reduced by a wavelength selective means and then introduced, as so-called injected stimulation radiation (seed radiation), into the other optical parametrical oscillator.

With this known laser arrangement, generation of the narrowband seed radiation and amplification of that radiation are accomplished in two separate oscillators. As a consequence, different subassemblies must be set in synchronysm when wavelength tuning is effected.

A Raman oscillator with which pumping radiation is divided into two partial beams by a beam splitter is described in U.S. Pat. No. 4,575,645. This arrangement, however, does not comprise a wavelength selective means.

DE 41 38 843 A1 describes an optical parametrical oscillator wherein a pump beam and a signal beam impinge on the crystal to produce an idler beam and a signal beam, the energy of the pumping pulse largely being converted into the idler and signal beams mentioned.

U.S. Pat. No. 5,323,260 describes a delay means for pulse-shaped laser radiation.

SUMMARY OF THE INVENTION

It is an object of the invention to improve a tunable narrowband optical parametrical oscillator (OPO) in such a way that its handling, especially the OPO adjustment will be facilitated, while the structural expenditure is kept at a minimum.

This object is met, according to the invention, in that a pumping pulse is divided by at least one beam splitter into at least two partial pulses and a delay between the partial pulses is adjusted so that a first partial pulse will pump the crystal of the optical parametrical oscillator and radiation thus generated is selected in a narrow band by the wavelength selective means and returned to the crystal to pass once more through the same when another partial pulse pumps the crystal.

In accordance with a preferred modification of the invention the wavelength selective means is disposed inside the resonant cavity of the OPO.

Further preferred modifications of the invention may be gathered from the dependent claims.

The invention thus uses a single non-linear optical crystal both for generating the seed radiation and for subsequently amplifying the narrowband radiation. In this manner not only the structure of the OPO is simplified but also its handling, especially the adjustment of the wavelength.

BRIEF DESCRIPTION OF THE DRAWING

Embodiments of optical parametrical oscillators will now be described in greater detail with reference to the drawing, in which.

DESCRIPTION OF PREFERRED EMBODIMENTS

Figure 1:
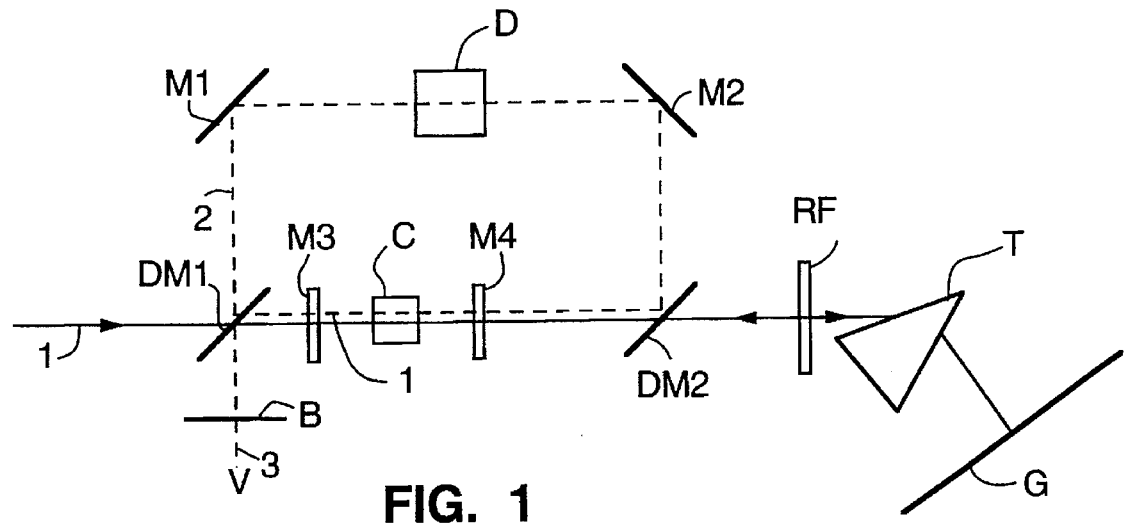
FIG. 1 illustrates a first embodiment of a tunable narrowband optical parametrical oscillator (OPO)

In the case of the embodiment shown in FIG. 1, pulsed pumping radiation 1 is directed onto a dichroitic dividing mirror DM1 which splits it up into two partial pulses. A first partial pulse 1 continuous straight ahead to pump the optical parametrical oscillator OPO constituted by a crystal C and resonator mirrors M3, M4. The resulting broadband radiation is coupled out of the resonant cavity by means of the mirror M4 and will then pass through a wavelength selective means (embodied here, for instance, by a broadening prism T and a grid G in a Littrow or Littmann assembly). Having passed the wavelength selective means, the radiation is of narrowband configuration, and this narrowband radiation is coupled back into the resonant cavity of the OPO (mirrors M3, M4). In the embodiment shown, this coupling back into the resonator is accomplished by a room filter RF embodied, for example, by two wedge-shaped plates arranged in mirror symmetry and separating the broadband radiation in space from the narrowband radiation. Having been coupled back, the narrowband radiation will pass through the crystal C once again, more specifically exactly when the second partial pulse 2 of the pumping radiation likewise pumps the crystal. To achieve that, the second partial pulse 2 moves through a delay path from the beam splitter DM1 to a first mirror M1, whereupon it has to cover a greater delay distance, as indicated by box "D" (delay), in order to be reflected by a second mirror M2 towards a dichroitic mirror DM2 which then couples the second partial pulse through mirror M4 into the resonant cavity and the crystal C.

The delay distance "D" is selected to have a length which will assure time control such that the second partial pulse pumping the crystal will arrive at the crystal C for pumping it so that the other, narrowband, partial pulse having been returned to the crystal by the wavelength selective means will become amplified.

The narrowband radiation 3 having thus been amplified is coupled out by way of the mirror M3 and the dichroitic mirror DM1 in order to be subsequently separated by a diaphragm B from the broadband radiation which likewise has been produced.

The embodiment shown in FIG. 1 may be modified in the sense that a plurality of etalons, a combination of a grid and one or more etalons, or prisms are employed as the wavelength selective means.

Figure 2:
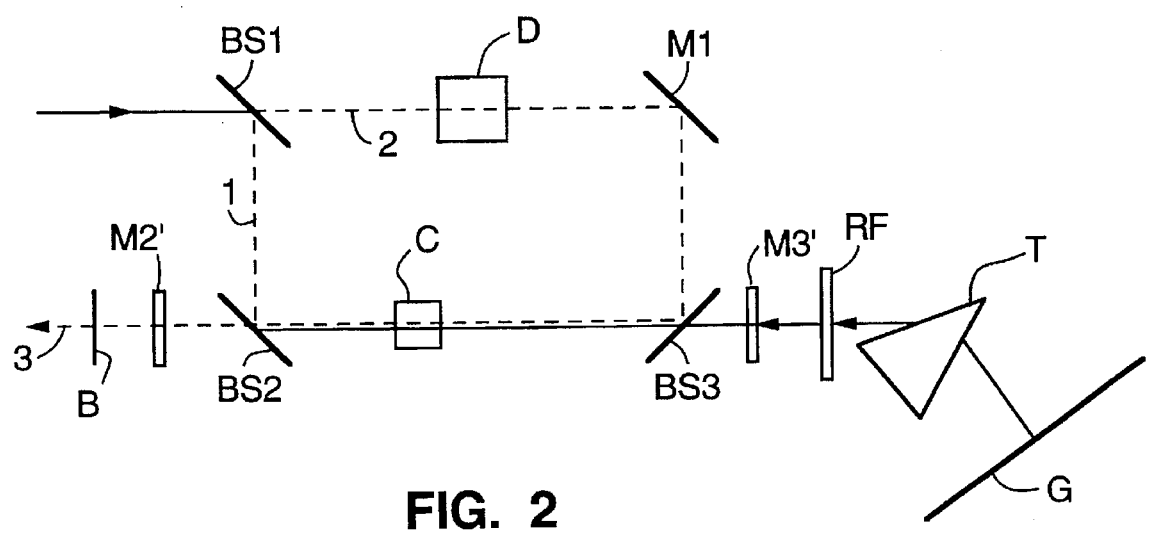
FIG. 2 illustrates a second embodiment of a tunable narrowband optical parametrical oscillator (OPO).

FIG. 2 shows a modified embodiment of an optical parametrical oscillator OPO. In this case the pulse-shaped pumping radiation impinges on a beam splitter BS1 which splits it up into two parts. A first Partial pulse 1 is directed by a beam splitter BS2 to the non-linear crystal C. In this embodiment the OPO is formed by the crystal C and the resonator mirrors M2', M3'. The broadband radiation generated by the first partial pulse 1 is coupled out by means of the mirror M3' and passes through a wavelength selective means, e.g. a broadening prism T and a grid G. The resulting narrowband radiation is directed back to the resonant cavity of the OPO, if desired through a room filter RF. The room filter RF, for instance, may comprise two partial plates arranged in mirror symmetry and separating the broadband radiation in space from the narrowband radiation. The returning narrowband radiation once more passes through the crystal C, more specifically at precisely the time when the second partial pulse 2 which had passed straight through the beam splitter BS1 is directed by a beam splitter BS3 back into the crystal C to pump it, after having covered a delay distance D and undergone reflection at the mirror M1.

Having thus been amplified, the narrowband radiation 3 is coupled out by means of the resonator mirror M2' of the OPO. A diaphragm B separates the narrowband radiation 3 from the broadband radiation.

With this embodiment, too, the wavelength selective means may comprise one or more etalons, a combination of a grid and one or more etalons, or prisms.

As is well know, the output of a non-linear crystal in an OPO includes radiation at signal and idler wavelengths. The prism T in FIGS. 1 and 2 can be configured to narrow either the signal or idler wavelengths.

In the preferred embodiment, an optical telescope system can be used to adjust the diameter of the beam of pumping pulses reaching the crystal C. The preferred embodiment can also include a means for compensating for beam walk-off. The walk-off compensation can be located either within the resonant cavity or between the resonant cavity and the wavelength selective member.

What is claimed is:

1. A tunable narrow band optical parametric oscillator comprising:

a resonant cavity;

a non-linear optical crystal located within the cavity;

a wavelength selective member for narrowing the wavelengths of light emitted from the cavity;

means for generating optical pulses for pumping the crystal; and means for coupling the pump pulses into the crystal, said coupling means including a means for dividing the pump pulses into at least two partial pulses, said coupling means further including a means for introducing a delay between the partial pulses wherein the delay between the pulses is adjusted so that light generated by the crystal in response to the first partial pulse can reach the wavelength selective member and return to said crystal at a time when another of said partial pulses is reaching said crystal so that a substantially narrow band output is generated from said cavity.

2. A parametric oscillator as recited in claim 1 wherein said wavelength selective member is located outside the resonant cavity.

3. A parametric oscillator as recited in claim 1 or 2 wherein said wavelength selective member is one of a combination of a grid and one or more etalons, a plurality of prisms and one or more etalons.

4. A parametric oscillator as recited in claim 1 or 2 wherein the light coupled back into the crystal from said wavelength selective member is in the range of the signal wavelength of the oscillator.

5. A parametric oscillator as recited in claim 1 or 2 wherein the light coupled back into the crystal from said wavelength selective member is in the range of the idler wavelength of the oscillator.

6. A parametric oscillator as recited in claim 1 or 2 wherein said coupling means is located outside the resonant cavity.

7. A parametric oscillator as recited in claim 1 or 2 wherein said resonant cavity includes at least one beam splitting mirror which also forms a portion of said coupling means.

8. A parametric oscillator as recited in claim 1 or 2 wherein said partial pulses pass through said crystal in the same direction.

9. A parametric oscillator as recited in claim 1 or 2 wherein said partial pulses pass through said crystal in opposite directions.

* * * * *